UNITED STATES PATENT OFFICE.

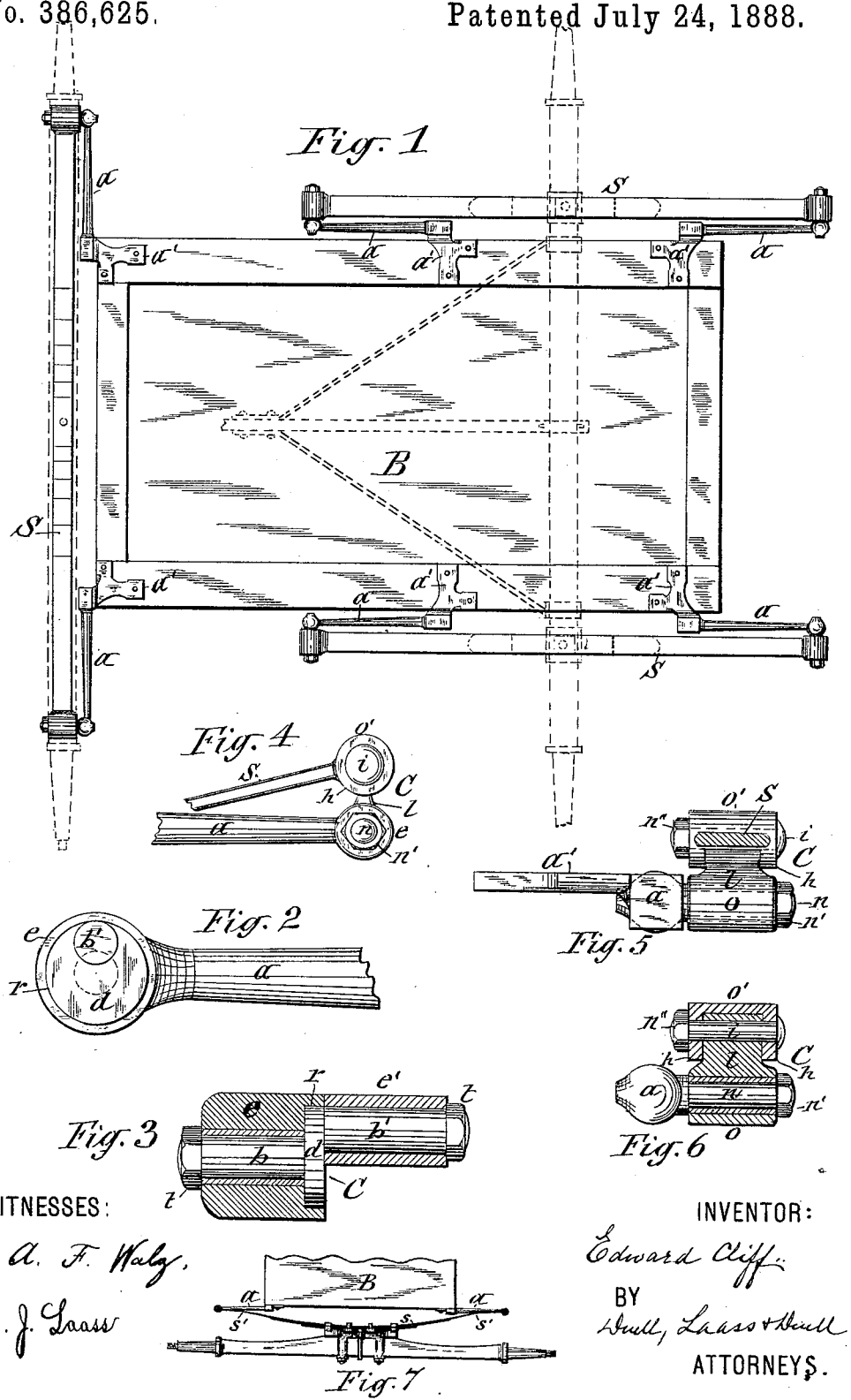

EDWARD CLIFF, OF ROCHESTER, NEW YORK.

SPRING-VEHICLE.

SPECIFICATION forming part of Letters Patent No. 386,625, dated July 24, 1888.

Application filed March 24, 1888. Serial No. 268,317. (No model.)

*To all whom it may concern:*

Be it known that I, EDWARD CLIFF, of Rochester, in the county of Monroe, in the State of New York, have invented new and useful Improvements in Spring-Vehicles, of which the following, taken in connection with the accompanying drawings, is a full, clear, and exact description.

This invention relates to the class of spring-vehicles in which the body is supported on semi-elliptic springs by means of arms projecting from the body in opposite directions and coupled at their free ends to the ends of the springs.

Hitherto the aforesaid body-supporting arms were connected to the body by means of torsion-springs, which afforded to the arms a certain degree of elasticity. Although this is desirable in many vehicles, yet such construction and combination of parts are not well adapted for the so-called "buckboard-wagon." For this purpose I now attach the body-supporting arms rigidly or inflexibly to the body and employ peculiarly-constructed swinging couplings for connecting the free ends of the arms to the ends of the spring, all as hereinafter more fully described, and specifically set forth in the claims.

In the annexed drawings, Figure 1 is an inverted plan view of a vehicle embodying my improvements. Fig. 2 is an enlarged side view of the free end portion of the body-supporting arm with my improved coupling connected thereto. Fig. 3 is a vertical transverse section of said coupling and eyes of the arm and spring. Fig. 4 is a side view of another style of coupling adapted for connecting the arm to the spring. Fig. 5 is a view of the same coupling, taken in a plane at right angles to the spring. Fig. 6 is a vertical transverse section of said coupling; and Fig. 7 is an end view of a vehicle, showing the form of the spring.

Similar letters of reference indicate corresponding parts.

B denotes the body of the vehicle; S S S, the body-supporting springs mounted on the axle; and *a a* are the arms by which the body is connected to the spring. Each of said arms I form with an attaching-plate, *a'*, in one piece and rigidly secure said plate to the body B, preferably to the frame thereof, as illustrated in Fig. 1 of the drawings. The arms are thus inflexible on the body. They project from the body in opposite directions similar to the body-supporting arms shown in my patent of March 13, 1888, No. 379,366, and are connected to the ends of the spring S. This spring I preferably form with the usual inverted bow-shaped central portion, *s;* but the end portions, *s' s'*, thereof I curve reverse from the central portion, as illustrated in Fig. 7 of the drawings. This form of the spring obviates undue elongation thereof when subjected to a load, and therefore said spring allows the end of the arms *a a* to be coupled directly to the spring, as represented in said figure. However, in practice I find that I obtain a better action of the spring, with less strain on the arms *a a*, by coupling said parts by means of swinging couplings C, one form of which is illustrated in Figs. 4, 5, and 6 of the drawings, and consists of perforated ears *h h* on the side edges of the spring and a concave cap, *o'*, uniting said ears at their upper portions. From a bolt, *i*, passing through the ears *b b*, is suspended the hanger *l*, which is formed at its lower end with an eye, *o*, parallel with the aforesaid bolt, and through this eye projects the stud-pin *n*, formed on the end of the arm *a*. Nuts *n'* and *n"*, applied, respectively, to the screw-threaded protruding end of the stud-pin and to the bolt *i*, complete the coupling.

In order to render the coupling more compact, I form said coupling of two pins, *b b'*, united end to end and eccentrically in relation to each other, as illustrated in Figs. 2 and 3 of the drawings. The pins are screw-threaded on their ends, and one of them passes through an eye, *e*, formed on the end of the arm *a*, and the other passes through an eye, *e'*, formed on the end of the spring, and both are provided with nuts *t t* on their ends. In order to obtain a more secure connection between the two pins *b b'*, I form the same with an intermediate collar, *d*, from opposite sides of which the pins project, and for the purpose of bringing the spring as near as possible to the side of the arm I form the end of the eye *e* with a recess, *r*, in which the collar *d* is seated.

Having described my invention, what I claim as new, and desire to secure by Letters Patent, is—

1. In combination with the axle and body B, the spring S, mounted on the axle, the arms $a\ a$, projecting rigidly from the body in opposite directions, and swinging couplings $c\ c$, connecting the ends of said arms to the ends of the spring, substantially as described and shown.

2. In combination with the axle and body B, the spring S, mounted on said axle, the arms $a\ a$, extending rigidly from the body in opposite directions and each formed with the attaching-plate $a'$ in one piece, and rigidly secured to the body and connected at their free ends to opposite ends of the aforesaid spring, substantially as described and shown.

3. In combination with the body-supporting arm formed with the eye $e$, and the spring S, formed with the eye $e'$, the coupling-pins $b\ b'$, united end to end and arranged eccentrically in relation to each other, as set forth and shown.

4. The combination of the body-supporting arm formed with the eye $e$ and recess $r$, and the spring S, formed with the eye $e'$, the collar $d$, seated in said recess, and the coupling-pins $b\ b'$, projecting from opposite sides of said collar eccentrically in relation to each other and formed in one piece with the said collar, substantially as described and shown.

In testimony whereof I have hereunto signed my name, in the presence of two witnesses, at Rochester, in the county of Monroe, in the State of New York, this 10th day of March, 1888.

EDWARD CLIFF. [L. S.]

Witnesses:
C. D. KIEHEL,
JAMES J. ALLEN.